April 9, 1957 F. BENQUET 2,788,405
ARRANGEMENT FOR CONTROLLING DIRECTION INDICATORS FOR VEHICLES
Filed Nov. 27, 1953 5 Sheets-Sheet 1

INVENTOR
FERNAND BENQUET

By Linton and Linton
ATTORNEYS

INVENTOR
FERNAND BENQUET
By Linton and Linton
ATTORNEYS

April 9, 1957 F. BENQUET 2,788,405
ARRANGEMENT FOR CONTROLLING DIRECTION INDICATORS FOR VEHICLES
Filed Nov. 27, 1953 5 Sheets-Sheet 3
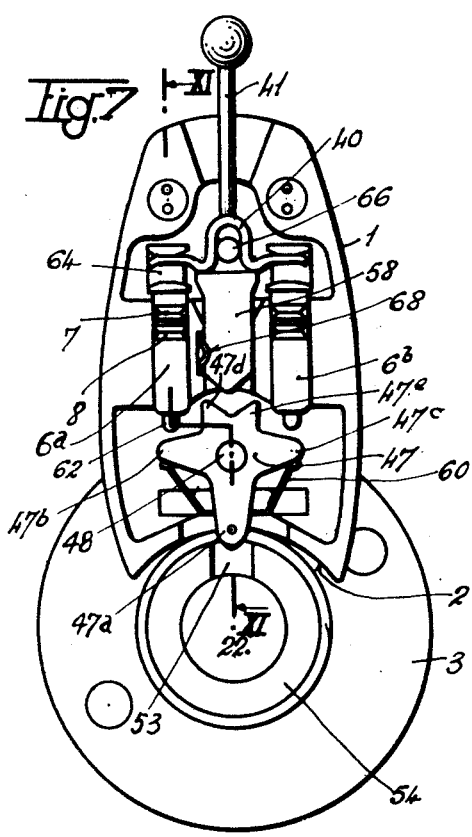
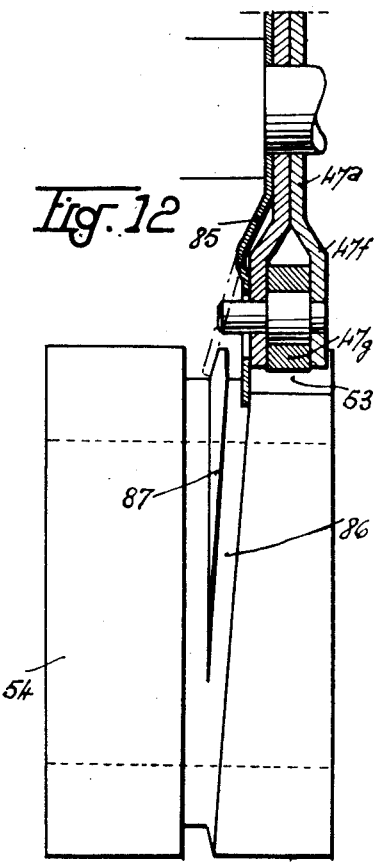
INVENTOR
FERNAND BENQUET
BY Linton and Linton
ATTORNEYS

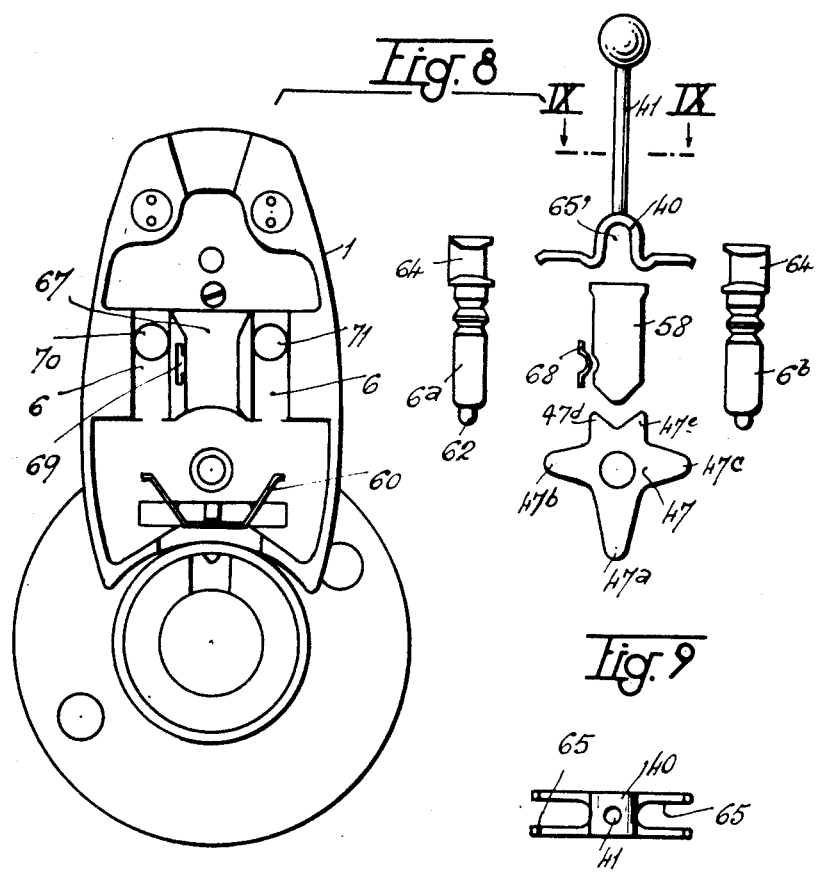

April 9, 1957  F. BENQUET  2,788,405
ARRANGEMENT FOR CONTROLLING DIRECTION INDICATORS FOR VEHICLES
Filed Nov. 27, 1953  5 Sheets-Sheet 5
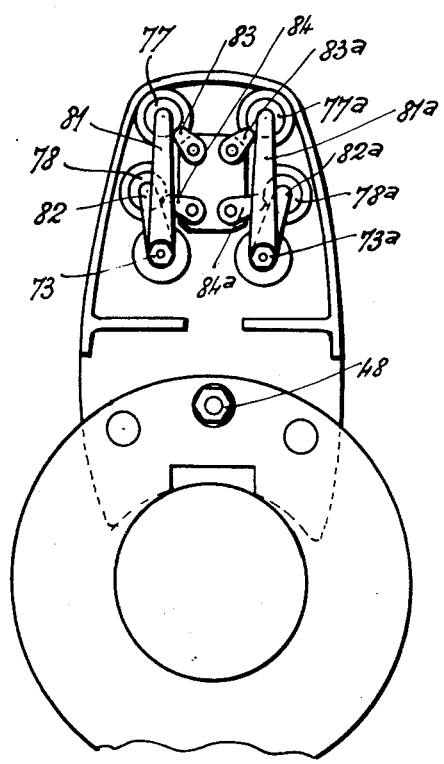
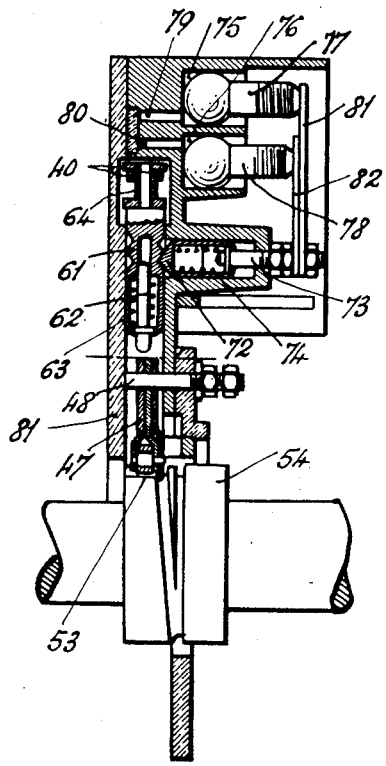
INVENTOR
FERNAND BENQUET
By Linton and Linton
ATTORNEYS

United States Patent Office 2,788,405
Patented Apr. 9, 1957

2,788,405

ARRANGEMENT FOR CONTROLLING DIRECTION INDICATORS FOR VEHICLES

Fernand Benquet, Paris, France

Application November 27, 1953, Serial No. 394,833

Claims priority, application France November 13, 1953

7 Claims. (Cl. 200—61.27)

My invention relates to arrangements for controlling direction indicators for vehicles and it has for its object to produce an arrangement of this type which is of a simple structure and may be operated manually and also through the agency of the steering wheel. A further object of the invention consists in producing a control arrangement such that an angular shifting of the steering wheel actuates the desired indicator if the driver has previously neglected doing so.

A further object of the invention consists in a control arrangement adapted to actuate two pairs of indicators, each pair including an indicator to the front of the vehicle and another indicator to the rear of said vehicle.

According to a still further object of my invention, the control arrangement is provided with tell-tale lamps each of which is inserted in the electric circuit feeding the corresponding indicator.

According to yet another object of my invention, the casing containing the control arrangement is designed in a manner such that the parts forming said arrangement are shaped in a manner such that the said parts are held in position together with the cover of the casing by means of two screws normally holding the cover in position.

Further objects and features of my invention will appear in the reading of the following description of various embodiments of said invention, said embodiments being given only by way of example while many modifications may be brought thereto if desired, without unduly widening thereby the scope of the invention as defined in the accompanying claims. Said embodiments are illustrated in accompanying drawings, wherein:

Fig. 7 is a view from above of a further embodiment.

Fig. 8 is a view thereof also from above after removal of the cover, the different parts of the arrangement being shown in exploded view on the outside of the actual casing.

Fig. 9 is a partial cross-section through line IX—IX of Fig. 8.

Fig. 10 is a view from below of said second embodiment.

Fig. 11 is a cross-section through line XI—XI of Fig. 7.

Fig. 12 is a view on a larger scale of a detail of Fig. 11.

Figure 1:
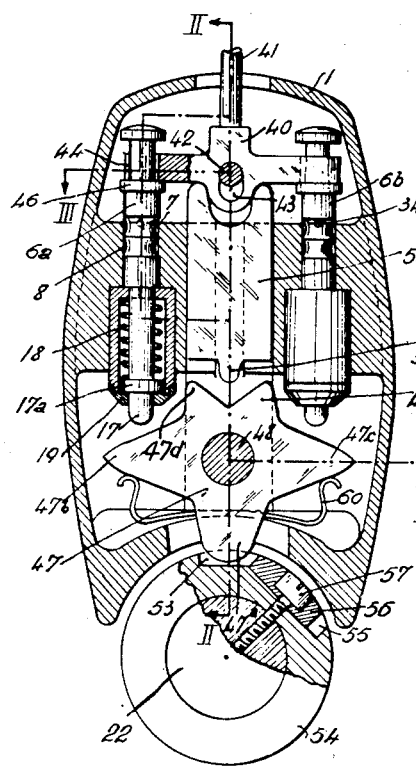
Fig. 1 is a longitudinal vertical sectional view of a first embodiment.
Figure 2:
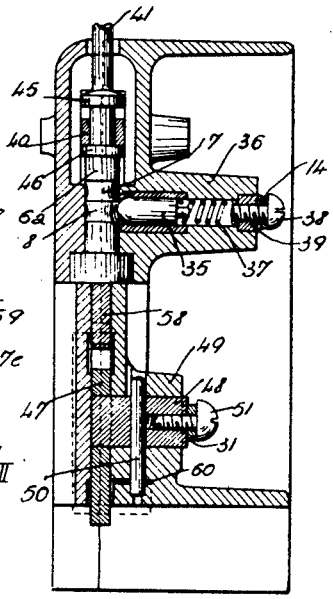
Fig. 2 is a longitudinal cross-section through line II—II of Fig. 1.
Figure 3:
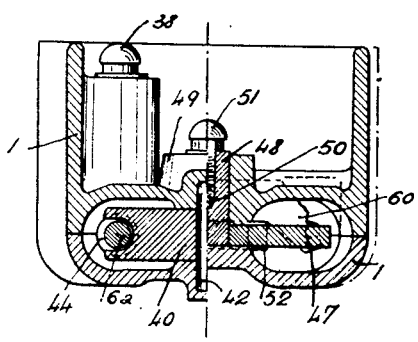
Fig. 3 is a cross-section through the broken line III—III of Fig. 1.

The control system illustrated in Figs. 1 to 6 includes a casing 1 of insulating material, one of the ends of which assumes a concave shape and which is secured through means which have not been illustrated in a manner such that said concave end is located near the steering column 22 of the vehicle, the axis of the concave end of the casing registering with the axis of said steering column.

Inside the casing 1 are slidingly mounted two hollow plungers 6a and 6b inside each of which may slide a rod 17. A spring 18 housed inside each plunger and surrounding the rod 17 urges a shoulder 17a on said rod into contact with a nut 19 screwed inside the end of the plunger 6. The end of the rod 17 extends through the nut 19 to the outside of the plunger. The chamber enclosed inside the plunger and in which the rod 18 slides communicates with the outer atmosphere through an opening 34. The plungers are provided each with two peripheral annular grooves 7 and 8 adapted to be selectively engaged by a projection 35, slidingly mounted inside a boss 36 rigid with the casing, said projection 35 being urged against the plunger by a spring 37. The groove 8 when registering with the location of the projection 35 corresponds to the inoperative position of the plunger while the groove 7 defines similarly the position into which the driver should bring the plunger for actuation of the corresponding indicator. A screw 38 is screwed inside the nut 39 which holds said spring 37 in position inside the boss 36, said screw urging into contact with said nut the eye 14 at the end of a wire feeding the left hand side or right hand side direction indicator, as the case may be; said direction indicator is thus electrically connected with the plunger through the spring 37. A control lever 40 rigid with a control rod 41 is pivotally secured inside the casing 1 by means of a spindle 42 extending transversely through the casing and rigid therewith and slidingly engaging a longitudinal slot 43 formed inside the lever 40. Each of the ends of the lever 40 is provided with a notch 44 engaged by the corresponding plunger between its two shoulders 45 and 46 formed on the end of said plunger facing said lever 40. When the lever 40 is inoperative, it assumes a position perpendicular to the plunger, and rests on the inner shoulders 46 of both plungers and also on the spindle 42 through the end of its slot 43, whereby a tilting of the control rod 41 towards either of the plungers has for its result to urge said plungers inwardly into the casing 1.

A cam 47 is pivotally secured inside the casing 1 round a spindle 48 perpendicular to the plungers 6a and 6b, said spindle 48 being rigid with a boss 49 formed on the casing and secured to said spindle through a transverse pin 50.

A screw 51 urges into contact with the end of the spindle 48 the eye 31 of a lead connected with one of the terminals of the battery, the other terminal of the latter being connected with the direction indicators. The boss 47a on the cam 47 projects through a slot 52 provided in the concave end of the casing and engages a longitudinal slot 53 in a sleeve 54 fitted over the steering column 22 of the vehicle. The sleeve 54 is provided with a peripheral recess 55 inside which is laid an eccenter 56 while a screw 57 secures the eccenter together with the sleeve on the steering column 26. The eccenter 56 defines one of the sides of the slot 53 whereby it is possible through a rotation of said eccenter to adjust the width of said slot 53 and to make up thus for the play which may after some time arise in the steering system.

The cam 47 includes two other bosses 47b and 47c which are located in register with the plungers 6a and 6b. Consequently when the cam rocks, one of the bosses 47b or 47c meets the rod 17 of the corresponding plunger, whereby the cam is electrically connected with the plunger and provides for the operation of the corresponding direction indicator. Inside an axial bore of the casing is slidingly mounted a small plate 58 adapted when moving towards the lever 40 to urge the latter upwardly, said plate including a projection 59 on the side facing away from the lever 40. The cam 47 includes in addition to the three bosses already referred to two bosses 47d and 47e located to either side of a point facing the projection 59 and shaped so as to be capable of urging said projection 59 upwardly and consequently the said plate 58 towards the lever 40 when the cam is angularly shifted.

A spring 60 secured to the casing 1 by a pin 50 and engaging the bosses 47b and 47c of the cam urges the latter into its neutral inoperative position illustrated in Fig. 1 when the vehicle progresses along a straight line.

Figure 4:
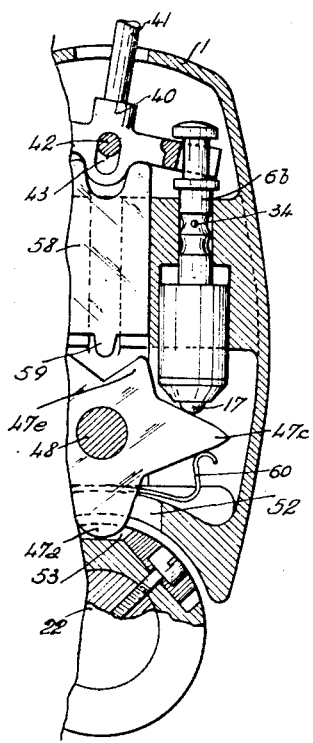
Figs. 4 and 5 are partial views similar to Fig. 1 of the arrangement during two operative stages.
Figure 5:
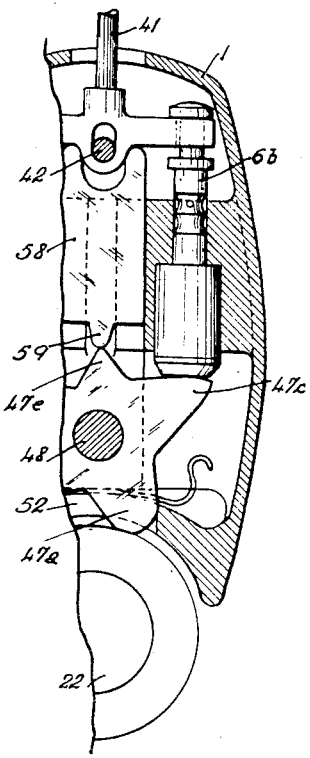
Figure 6:
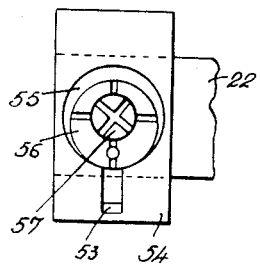
Fig. 6 is a side elevational view of the sleeve fitted on the steering column and forming part of the arrangement illustrated in Fig. 1.

The control system operates in the following manner. When the driver wishes to show he is about to turn, he shifts the control rod 41 angularly in the suitable direction as shown in Fig. 4. The lever 40 rocks round the spindle 42 and urges downwardly the corresponding plunger, the plunger 6b for instance in the case illustrated; consequently the rod 17 rigid with said plunger closes the circuit feeding the direction indicator connected with said plunger over the cam 47 whereby the corresponding indicator is actuated. When the driver turns then the steering wheel, say anti-clockwise as shown in Fig. 5, the sleeve 54 on the steering column 22 rocks with the wheel and causes the cam 47 to turn round its carrier spindle so that the cam boss 47c meets the rod 17 which has been precedingly depressed and urges said rod back into its starting position against the action of the spring 18. When the rod 17 has been completely depressed inside the casing, the cam 47 continues turning and urges the plunger upwardly over the rod 17 to return said plunger also back into its starting position. At the same time, the boss 47e on said cam meets the projection 59 on the plate 58 and urges the latter upwardly towards the lever 40. The latter is thus raised and urged against the shoulders 45 of the plungers whereby the above-mentioned depressed plunger 6b is reliably brought into its starting position even if the boss 47c had not ensured this return movement in a complete manner, the indicator remaining of course operative during this movement. When the driver finally returns his steering wheel, say clockwise, into its normal position for rectilinear travel, the cam 47 returns into its neutral position. During this movement, the rod 17 projects out of the plunger 6b and when its shoulder 17a meets the nut 19 on the latter, the contact between the rod 17 and the cam 47 opens by reason of the receding movement of the cam and, the circuit feeding the direction indicator being opened, the indicator ceases operation.

When the driver neglects operating the rod 41, the cam 47 pivots as soon as the steering wheel is turned and one of its bosses 47b or 47c meets the rod 17 on one of the plungers whereby the desired direction indicator is energized and starts operating in spite of the driver having neglected operating the control rod.

Lastly, should the driver make a mistake and operate through the lever 41 the right hand indicator, whereas he intended turning to the left, the right hand indicator will cease operating as soon as the vehicle begins turning to the left by reason of the cam disengaging the corresponding rod 17 and, at the same time, the left hand indicator is started and consequently, even in the case of such an error made by the driver, the control arrangement cuts out this error and provides for the correct operation of the indicator on the side towards which it is desired to turn.

In the embodiment illustrated in Figs. 7 to 12, the casing 1 is provided with a terminal surface 2 which is concave as in the case of the first embodiment and it is secured radially with reference to the steering column of the vehicle through the plate 3. The casing is provided with two housings 6 arranged symmetrically with reference to the longitudinal axis of the casing, each casing enclosing a plunger 6a or 6b. These plungers include as shown in Fig. 11 a hollow body 1 inside which may slide a rod 62 urged outwardly by a spring 63. The upper end of the plunger is provided with two superposed annular peripheral grooves 7 and 8 and above the latter with a section of reduced diameter 64 adapted to be engaged by one of the forks 65 on the lever 40 rigid with the control rod 41 (Figs. 7, 8 and 9).

Said lever 40 assumes cross-sectionally the shape of an inverted U in its medial part so as to form a housing 65' inside which is fitted a transverse spindle 66 which as described hereinafter serves also for clamping the cover of the casing in position. It is readily apparent that the lever 41, when angularly shifted round the spindle 66, depresses one of the plungers 6a—6b so as to urge it into contacting relationship with the rockable cam 47. This closes the circuit through the corresponding pair of indicators as will be disclosed hereinafter.

The cam 47 is rockably mounted on the spindle 48 and it carries a projection 47a which enters the recess 53 formed in a ring or sleeve 54 rigid with the steering column 22. As clearly apparent from inspection of Figs. 11 and 12, the end of the projection 47a is slotted transversely to form a fork 47f between the arms of which is revolubly carried a roller 47g, which arrangement furthers the arrangement of the projection 47a over the periphery of the ring 54 engaged by the periphery of said rollers 47g. Said cam 47 is also adapted to act through its bosses 47d and 47e on the small plate 58 housed in the recess 67 of the casing and located between the lever 40 and the cam 47. In the absence of any external stressing, the cam 47 is returned into its neutral position as illustrated in Fig. 7 by the spring 60.

The arrangement disclosed operates as follows: starting from the neutral position illustrated in Fig. 7, and supposing the driver shifts the lever 41 angularly, said lever first urges the small plate 58 downwardly and consequently said plate engages the hollow space defined between the two bosses 47d and 47e of the cam. Furthermore, the lever 41 depresses the corresponding plunger, the rod 62 carrying which meets the boss 47c or 47b on the cam as the case may be, whereby the circuit over the corresponding pair of direction indicators is closed. When the driver turns his wheel, the ring 54 also turns and constrains the cam 47 to rock in the direction opposed to the rotation of the wheel. The contact is thus maintained, but the rotation of the cam has for its result to urge the small plate 58 towards the rod 41 and consequently return the two plungers into their outer position illustrated in Fig. 7, while holding in their operative or illuminated conditions the precedingly energized pair of indicators. When the wheel is turned back so as to return the vehicle into its condition of rectilinear progression, said movement opens the circuit and returns the indicator or signalling device into its inoperative position as soon as the boss 47a has returned into the recess 53. This returns as a matter of fact the different parts of the apparatus into the neutral position illustrated in Fig. 1. It is also apparent that, if the driver has neglected operating the lever 41, the rotation of the cam 47 closes the contact corresponding to the side towards which the driver is beginning to turn.

The small plate 58 is held inside its recess 67 by a small flat spring 68 engaging a notch 69 in the vertical wall of the casing and pressing sideways on said plate. The same wall is provided with openings 70 and 71 housing each a projection 72 slidingly mounted on the stem of a bolt 73 (or 73a) and urged outwardly over said stem by a spring 74 (Fig. 11). Each of the projections 72 cooperates as illustrated in said Fig. 11 selectively with either of the grooves 7 and 8 in the plungers. This has for its result to hold transiently fast the plunger in the position occupied thereby, a neutral position in the case of Fig. 11.

In the part of the casing furthest away from the steering wheel are provided as shown in Fig. 11 two housings 75 and 76 formed to either side of the longitudinal axis of the casing and adapted to contain two tell-tale bulbs such as 77—78 on one side and 77a—78a on the other side. Each of said bulbs is inserted on the circuit of one of the indicators. Each housing 75—76 is provided with a port 79 or 80 extending into register with the cover of the casing, which cover is transparent so as to allow the driver to ascertain whether the bulbs are ignited and to check whether the different indicators are actually operative.

Each bolt 73 or 73a (Fig. 10) is electrically connected through a contact blade such as 81—82 or 81a—82a with the socket of the corresponding bulbs respectively 77—78—77a—78a. The tell-tale bulbs are further connected with an indicator through the following contact blades: the blade 83 (Fig. 10) connected with the right hand front indicator, 84 connected with the right hand rear indicator, 83a connected with the left hand front indicator and 84a connected with the left hand rear indicator. Lastly, the spindle 48 carrying the cam 47 is connected with say the positive terminal of the battery. Consequently, each time one of the rods 62 engages the cam, the corresponding circuit is closed through the agency of said cam, of the plunger, of the projection 72, of the contact blades 81—82, of the tell-tale bulbs, of the contact blades 83 and 84 and of the corresponding indicators which are connected with the negative terminal of the battery.

If one of the indicators ceases operation, the corresponding bulb is no longer energized.

There is preferably provided an arrangement which becomes operative when the driver has turned the steering wheel through more than one revolution. When he returns into the neutral position corresponding to rectilinear progression by turning his steering wheel in the opposite direction, the tail end or boss 47a on the cam will normally return into the recess 52 and, as the steering wheel continues turning, said tail-end rocks in the opposite direction and causes the other pair of the indicators to become operative.

In order to cut out such a drawback, the boss or tail-end 47a is rigid with a spring blade 85 (Fig. 12), said spring blade extending slightly beyond the tail-end 47a and engaging a groove 86 in the ring 54. Inside said groove is formed a slope 87 of which the higher medial point registers with the recess 53 while the two lower sections of said slope assume diametrically opposed locations.

When the driver turns his steering wheel by more than one revolution and returns thenafter in the other direction, the spring blade 85 rises over the slope, which results in increasing friction; said friction prevents the tail-end 47a from dropping back immediately into the notch 53 so that the indicator cannot be untimely actuated. However, when the spring blade 85 is again brought into register with said notch, when the rotation of the steering wheel has come to an end, the tail-end 47a drops into the notch 53 and the whole arrangement assumes again its neutral position.

The embodiment of the invention which has been described hereinabove is given obviously solely by way of example and by no means in a limiting sense and various detail modifications may be brought thereto without unduly widening thereby the scope of the invention as defined in accompanying claims. In particular, only one tell-tale bulb may be provided for each pair of indicators. Similarly, the blades 81, 81a, 82, 82a could be provided in the form of bi-metallic strips so as to make the bulbs 77, 78 flicker.

My claim is:

1. A multiple circuit controlling electrical switch comprising a casing, a pair of plungers axially displaceable in said housing, a manually operable lever pivotally mounted on said casing and adapted to axially displace one of said plungers at a time, a cam rotatably carried by said casing beneath said plungers and having radially extending edge surfaces, said cam having a pair of said edge surfaces arranged each for engaging an end of one of said plungers, manually rotatable means for moving said pair of cam edge surfaces each against their corresponding plunger for displacing said plunger in a direction opposite to the displacement thereof by said lever and then moving said cam out of contact with said plungers, means for connecting said plungers to separate electrical circuits and means for connecting said cam to both of said circuits.

2. A multiple circuit controlling electrical switch comprising a casing, a pair of plungers axially displaceable in said housing, a manually operable lever pivotally mounted on said casing and adapted to axially displace one of said plungers at a time, a cam rotatably carried by said casing and positioned for at times engaging one of said plungers, manually operable means for pivoting said cam whereby said cam will move against said plungers in a direction opposite to that provided by said lever, a plate slidably positioned in said casing and arranged for being contacted by said cam upon the pivoting thereof and moving against said lever pivoting the same from its plunger displacing position, means for connecting said plungers to separate electrical circuits and means for connecting said cam to said circuits.

3. A multiple circuit controlling electrical switch comprising a casing, a pair of plunger axially slidable in said casing, manually operable means for axially displacing one of said plungers at a time, a cam rotatably carried by said casing and arranged for contacting an end of each of said plungers, manually rotatable means for pivoting said cam against said plungers for returning the displaced plunger to its original position, each of said plungers having a pair of peripheral annular grooves, a pair of spring held projections each bearing against the periphery of one of said plungers for moving into said plunger grooves tending to hold said plunger in its circuit closing and opening positions, means for connecting said projections each to a separate electrical circuit and means for connecting said cam to said circuits.

4. A multiple circuit controlling electrical switch comprising a casing, a pair of plungers axially slidable in said casing, a T-shaped lever slidably and pivotally carried by said casing and positioned with the head thereof connected to an end of said plungers for axially moving one of said plungers at a time upon the pivoting of said lever, a cam pivotally mounted on said casing below the opposite ends of said plungers, said cam having a pair of oppositely directed radially extending surfaces each for being in contact with the end of one of said plungers for axially moving the plunger in direction opposite to said lever, a plate slidably mounted in said casing with one end positioned for contacting said lever head and sliding the same with said plungers away from said cam, said cam having further radially extending surfaces for engaging said plate and moving the same against said lever upon the further pivoting of said cam, a manually rotatable ring having a peripherial recess, said cam having a further radial projection riding on said ring periphery and capable of entering said ring recess whereby said ring pivots said cam, means for connecting said plungers each to a separate electrical circuit and means for connecting said cam to both of said circuits.

5. A multiple circuit controlling electrical switch comprising a casing, a pair of plungers slidably mounted in said casing and each having a pair of spaced stops provided on one end portion thereof, a bar extending between said plungers and having openings in the end thereof with each opening slidably receiving one of said plungers between said stops thereof, said bar having a central slot, a pin carried by said casing extending through said bar central slot, a lever for rocking said bar about said pin and axially moving one of said plungers at a time, a plate slidably mounted below and in line with said bar in said casing, a manually rotatable ring, means operatively connected to said ring and said plate for sliding said plate against said bar raising the same and said plungers upwardly upon rotation of said ring and positioned for contacting the other end of said plungers upon relative movement therebetween, means for connecting each of said plungers to a separate electrical circuit and means for connecting said operatively connected means to said circuits.

6. A multiple circuit controlling electrical switch comprising an elongated casing, a pair of plungers axially slidable in and longitudinally of said casing, each of said plungers having a pair of spaced apart stops on one end portion thereof, a T-shaped lever pivotally and slidably mounted in said casing, said lever having each end of the head thereof positioned for engaging said stops of one of said plungers upon movement of said lever, a member pivotally mounted in said casing beneath the other end of said plungers, said member having a pair of arms each for contacting one of said plungers upon relative movement therebetween, a plate slidably mounted in said casing and positioned for engaging said lever and sliding the same, a pair of fingers carried by said member each for engaging and moving said plate against said lever upon the pivoting of said member, a manually rotatable ring capable of pivoting said member upon rotation of said ring in either direction whereby each of said arms pushes one of said plungers therefrom and one of said fingers slides said plate raising said lever thereby lifting said plungers out of contact with said arms, means connecting each of said plungers to a separate electrical circuit and means connecting said member to said circuits.

7. A multiple circuit controlling electrical switch as claimed in claim 4, wherein said cam radial projection has a roller carried by the end thereof bearing on said ring periphery, a resilient plate also extends from said projection and said ring has a sloping peripheral projection upon which said resilient plate rides during the turning of said ring for slowing the movement of said projection during its return to said ring recess.

References Cited in the file of this patent

UNITED STATES PATENTS 1,998,691   Stanton _____ Apr. 23, 1935

FOREIGN PATENTS 1,020,199   France _____ Nov. 12, 1952